(12) United States Patent
Kubo et al.

(10) Patent No.: US 7,496,796 B2
(45) Date of Patent: Feb. 24, 2009

(54) APPARATUS, SYSTEM, AND METHOD FOR PREDICTING STORAGE DEVICE FAILURE

(75) Inventors: Robert A. Kubo, Tucson, AZ (US); David F. Mannenbach, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/337,391

(22) Filed: Jan. 23, 2006

(65) Prior Publication Data

US 2007/0174720 A1 Jul. 26, 2007

(51) Int. Cl.
*G06F 11/00* (2006.01)
(52) U.S. Cl. .......................................... 714/42; 714/47
(58) Field of Classification Search .................... 714/42, 714/47
See application file for complete search history.

(56) References Cited

U.S. PATENT DOCUMENTS

| | | | |
|---|---|---|---|
| 5,410,439 A | 4/1995 | Egbert et al. ................... 360/75 |
| 5,828,583 A * | 10/1998 | Bush et al. .................... 702/185 |
| 5,832,204 A | 11/1998 | Apperly et al. ......... 395/183.18 |
| 6,018,300 A | 1/2000 | Dowden et al. |
| 6,415,189 B1 * | 7/2002 | Hajji ............................ 700/79 |
| 6,771,440 B2 | 8/2004 | Smith ........................... 360/31 |
| 7,043,504 B1 | 5/2006 | Moore et al. |
| 2002/0184580 A1 * | 12/2002 | Archibald et al. ........... 714/719 |
| 2003/0061546 A1 | 3/2003 | Collins et al. ................. 714/42 |
| 2003/0204788 A1 | 10/2003 | Smith ........................... 714/47 |
| 2004/0051988 A1 | 3/2004 | Jing et al. ...................... 360/31 |
| 2004/0103337 A1 | 5/2004 | Smith ............................ 714/2 |

FOREIGN PATENT DOCUMENTS

| | | |
|---|---|---|
| CN | 1171181 | 1/1998 |
| CN | 1317742 | 8/2005 |
| WO | WO2004/097657 A2 | 11/2004 |

* cited by examiner

*Primary Examiner*—Robert Beausoliel
*Assistant Examiner*—Charles Ehne
(74) *Attorney, Agent, or Firm*—Kunzler & McKenzie

(57) ABSTRACT

An apparatus, system, and method are disclosed for predicting storage device failure. A technology descriptor module associates a technology descriptor with a storage device. A failure threshold module sets a predictive failure threshold for the storage device in response to the technology descriptor. In one embodiment, a workload management detection module detects workload management of the storage device. A threshold modification module may modify the predictive failure threshold in response to detecting the workload management of the storage device. A performance detection module detects a storage device error that exceeds the modified predictive failure threshold as a storage device predictive failure.

18 Claims, 6 Drawing Sheets

APPARATUS, SYSTEM, AND METHOD FOR PREDICTING STORAGE DEVICE FAILURE

BACKGROUND OF THE INVENTION

1. Field of the Invention

This invention relates to predicting storage device failure and more particularly relates to setting a predictive failure threshold for predicting failure in response to a technology descriptor.

2. Description of the Related Art

A data storage system typically comprises a plurality of storage devices such as hard disk drives, optical storage drives, magnetic tape drives, micromechanical devices, semiconductor devices, and the like. The data storage system may provide data storage for one or more hosts. Each host may store data to or retrieve data from the data storage system over a communications medium such as a network, an internal bus, or the like. The data storage system may store the data to or retrieve the data from one or more storage devices. Storage devices may be added to or removed from the data storage system to provide sufficient data storage capacity for the hosts.

The data storage system may be organized to store data redundantly. For example, the data storage system may maintain a copy of or mirror data from a first storage device on a second storage device. The mirrored data may be accessed from the second storage device if the first storage device fails.

The data storage system may also be organized as a redundant array of independent disks ("RAID") system as is well known to those skilled in the art. In a RAID data storage system, data may be stored in stripes across a plurality of storage devices in a redundant form. If one of the plurality of storage devices fails, the data storage system may recover the data from the other storage devices.

The data storage system may attempt to determine if a storage device is likely to fail so that proactive actions may be taken to protect the data. For example, the data storage system may periodically test each storage device. If a storage device satisfies failure criteria, the data storage system may migrate data from the storage device and notify an administrator that the storage device should be replaced or subjected to further tests.

Data storage systems have typically employed high-reliability, high-cost ("HRHC") storage devices, but recently data storage systems are also employing high-capacity, low-cost data ("HCLC") storage devices. Unfortunately, a HCLC storage device may be have the potential to fail when exhibiting a different set of criteria from an HRHC storage device. Yet if a HCLC storage device satisfies HRHC failure criteria when the HCLC storage device is not satisfying failure criteria for the HCLC storage device, the data storage system may still recognize a potential failure of the HCLC storage device. As a result the data storage system may migrate data from the HCLC storage device and take the HCLC storage device offline. Unfortunately, migrating data from the HCLC storage device may impact the performance of the data storage system, while taking the HCLC storage device offline for maintenance or replacement increases maintenance costs.

In addition, the HCLC storage device may be workload managed to reduce the stress to the HCLC storage device. For example, the duty cycle of the HCLC storage device may be reduced to prevent excessive wear to the HCLC storage device. The duty cycle may be the percentage of time the storage device is executing an operation as is well known to those skilled in the art. Unfortunately, the workload managed HCLC storage device may be more likely to satisfy failure criteria. If the data storage system recognizes a potential failure in the workload managed HCLC storage device, the data storage system may migrate data from the workload managed HCLC storage device and take the HCLC storage device offline, reducing data storage system performance and increasing maintenance costs.

From the foregoing discussion, it should be apparent that a need exists for an apparatus, system, and method that predicts storage device failures based on the characteristics of the storage device. Beneficially, such an apparatus, system, and method would predict failure based on the technology of each storage device, and reduce the number of operational storage devices erroneously removed from a data storage system.

SUMMARY OF THE INVENTION

The present invention has been developed in response to the present state of the art, and in particular, in response to the problems and needs in the art that have not yet been fully solved by currently available methods for predicting storage device failure. Accordingly, the present invention has been developed to provide an apparatus, system, and method for predicting storage device failure that overcome many or all of the above-discussed shortcomings in the art.

The apparatus to predict storage device failure is provided with a plurality of modules configured to functionally execute the steps of associating a technology descriptor with a storage device, setting a predictive failure threshold for the storage device, and detecting storage device errors that exceed the predictive failure threshold. These modules in the described embodiments include a technology descriptor module, a failure threshold module, and a performance detection module.

The technology descriptor module associates a technology descriptor with a storage device. The technology descriptor may specify one or more nominal operating characteristics for the storage device. In one embodiment, the technology descriptor describes a class of storage device, such as an HCLC storage device, a HRHC storage device, or the like.

The failure threshold module sets a predictive failure threshold for the storage device in response to the technology descriptor. In one embodiment, the predictive failure threshold is a specified number of errors within a specified time interval, and wherein each error is a failure to complete a storage operation within a specified response time.

The performance detection module detects a storage device error that exceeds the predictive failure threshold as a storage device predictive failure. The storage device error may be exceeding a maximum input/output ("I/O") latency for an I/O operation. Thus the apparatus predicts storage device failure based on storage device characteristics, avoiding the degradation of data storage system performance and maintenance costs resulting from taking a storage device offline that is functioning normally.

A system of the present invention is also presented to predict storage device failure. The system may be embodied in a data storage system. In particular, the system, in one embodiment, includes a data storage device, and a storage controller. The storage controller comprises a technology descriptor module, a failure threshold module, a workload management detection module, a threshold modification module, and a performance detection module. In addition, the storage controller may include a remediation module.

The storage device stores data. The storage device may be selected from a plurality of storage device classes including HRHC storage devices and HCLC storage devices. The storage device classes may represent a range of nominal operating characteristics. The storage controller manages the storage device. In addition, the storage controller may write data to and read data from the storage device over a communications medium such as a Fibre Channel connection, a small computer system interface ("SCSI"), or the like.

The technology descriptor module associates a technology descriptor with a storage device, wherein the technology descriptor specifies nominal operating characteristics for the storage device. The failure threshold module sets a predictive failure threshold for the storage device in response to the technology descriptor. The workload management detection module detects workload management of the storage device.

The threshold modification module modifies the predictive failure threshold in response to detecting the workload management of the storage device. The performance detection module detects a storage device error that exceeds the modified predictive failure threshold as a storage device predictive failure. In one embodiment, the remediation module remedies the storage device predictive failure in response to detecting the storage device predictive failure. The system predicts a failure of the storage device using the predictive failure threshold based on the storage device's technology descriptor.

A method of the present invention is also presented for predicting storage device failure. The method in the disclosed embodiments substantially includes the steps to carry out the functions presented above with respect to the operation of the described apparatus and system. In one embodiment, the method includes associating a technology descriptor with a storage device, setting a predictive failure threshold for the storage device, detecting workload management, and detecting storage device errors that exceed the predictive failure threshold. The method also may include modifying the predictive failure threshold.

A technology descriptor module associates a technology descriptor with a storage device. A failure threshold module sets a predictive failure threshold for the storage device in response to the technology descriptor. A workload management detection module may detect workload management of the storage device. In one embodiment, a threshold modification module modifies the predictive failure threshold in response to detecting the workload management of the storage device.

A performance detection module detects a storage device error that exceeds the predictive failure threshold as a storage device predictive failure. In one embodiment, a remediation module remedies the storage device predictive failure in response to detecting the storage device predictive failure. The method sets the predictive failure threshold in response to the technology descriptor for the storage device and predicts a failure of the storage device using the predictive failure threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention sets a predictive failure threshold in response to a technology descriptor associated with a storage device and predicts a storage device failure using the predictive failure threshold. In addition, the embodiment of the present invention may modify the predictive failure threshold in response to detecting workload management of the storage device. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
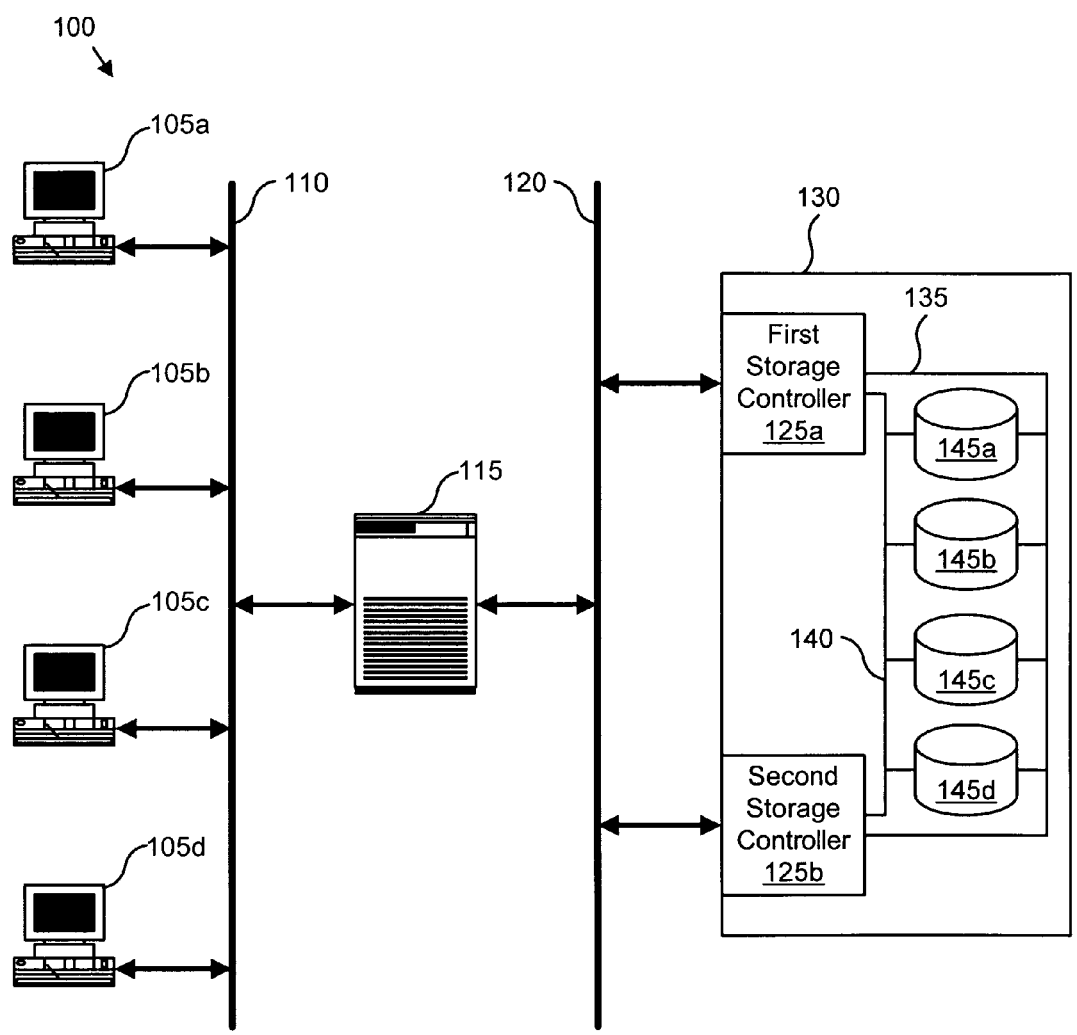
FIG. 1 is a schematic block diagram illustrating one embodiment of a data processing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code maybe a single instruction, or many instructions, and may even be distributed over several different code segments, among different programs, and across several memory devices. Similarly, operational data maybe identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data processing system 100 in accordance with the present invention. The system 100 includes one or more hosts 105, a network 110, a storage server 115, a storage network 120, and a data storage system 130. The storage system 130 includes one or more storage controllers 125 and one or more storage devices 145. Although the system 100 is depicted with four hosts 105, one network 110, one storage server 115, one storage network 120, one storage system 130, two storage controllers 125, and four storage devices 145, any number of hosts 105, networks 110, storage servers 115, storage networks 120, data storage systems 130, storage controllers 125, and storage devices 145 may be employed.

The storage devices 145 store data for the hosts 105. For example, a first host 105a may store and retrieve data for a database application in a first storage device 145a. The storage controllers 125 communicate with the storage devices 145 through a communications medium 135. The communications medium 135 may be a Fibre Channel connection, a SCSI connection, or the like. The storage controllers 125 manage the storage devices 145. For example, a first storage controller may initialize the first storage device 145a, create a logical volume comprising portions of the first storage device 145a, and write data to and read data from the first storage device 145a over the communications medium 135.

Each storage device 145 maybe a hard disk drive, an optical storage device, a magnetic tape drive, a micromechanical device, or a semiconductor device. For example, the first storage device 145a may be a hard disk drive. Each storage device 145 may be selected from a plurality of storage device classes. For example, hard disk drives may be HRHC storage devices 145 and HCLC storage devices 145.

An administrator for the data storage system 130 may select a storage device 145 and/or a class of storage devices 145 for a number of characteristics including cost, reliability, duty cycle, and the like. For example, the administrator may select an HRHC storage device 145 for the data storage system 130 for greater reliability and longer duty cycles. Alternatively, the administrator may select an HCLC storage device 145 to reduce data storage costs.

Each storage device class and/or each storage device may have one or more nominal operating characteristics. For example, a first HRHC storage device class may be configured to execute a first number of I/O operations per second while a second HCLC storage device class may be configured to execute a second and lesser number of I/O operations per second.

The storage controllers 125 may use a nominal operating characteristic to predict if a storage device 145 is likely to fail. For example, the first storage controller 125a may predict that the first storage device 145a is likely to fail if the number of I/O operations executed by the first storage device 145a falls below a specified threshold. Unfortunately, if the specified threshold is for an HRHC storage device class and the first storage device 145a is a member of the HCLC storage device class, the first storage controller 125a may erroneously predict that the first storage device is likely to fail. In addition, because each class of storage devices 145 and/or storage device 145 has distinct nominal operating characteristics, the storage controllers 125 may use the nominal operating characteristics of the first storage device 145a to predict that the second storage device 145b is likely to fail although the nominal operating characteristics of the first and second storage devices 145a, 145b may be significantly different.

In one embodiment, a storage device 145 may enter a workload-managed state to reduce stress to the storage device 145. For example, the first storage device 145 may enter a workload-managed state that limits executions of I/O operations to a specified number of operations per second. Entering the managed state may reduce the duty cycle and resulting stress to the storage device 145.

Unfortunately, the storage controller 125 may predict that a workload managed storage device 145 is likely to fail because of a change in the performance of the storage device 145 such as a reduction in I/O operation executions per second. Yet if the storage controller 125 erroneously predicts a storage device failure, the storage controller 125 may migrate data from the storage device 145, which reduces the system performance, and request maintenance for the storage device 145, which increases system cost.

The embodiment of the present invention employs a technology descriptor to specify a predictive failure threshold for each storage device 145 as will be discussed hereafter. Specifying the predictive failure threshold based on the technology descriptor may reduce erroneous predictions of storage device failure. In addition, the embodiment of the present invention may modify the predictive failure threshold in response to detecting workload management of a storage device 145 to further reduce erroneous predictions of storage device failure.

Figure 2:
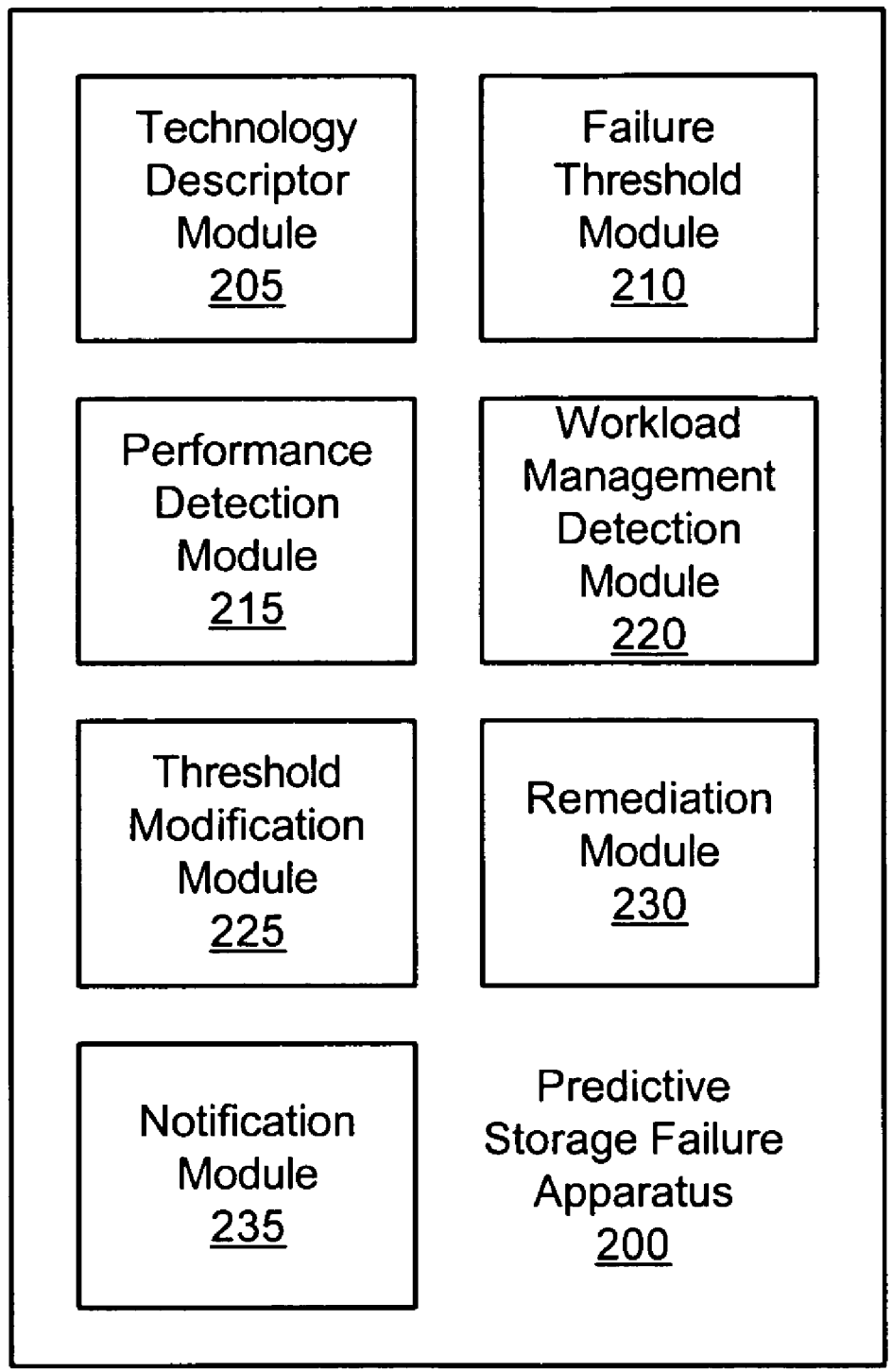
FIG. 2 is a schematic block diagram illustrating one embodiment of a predictive storage failure apparatus of the present invention.

FIG. 2 is a schematic block diagram illustrating one embodiment of a predictive storage failure apparatus 200 of the present invention. The apparatus 200 may be embodied in the storage controller 125 of FIG. 1. In addition, the description of the apparatus 200 references elements of FIG. 1, like numbers referring to like elements. The apparatus 200 includes a technology descriptor module 205, failure threshold module 210, performance detection module 215, workload management detection module 220, threshold modification module 225, remediation module 230, and notification module 235.

The technology descriptor module 205 associates a technology descriptor with a storage device 145 as will be described hereafter. In one embodiment, the technology descriptor specifies a storage device class. For example, the technology descriptor may specify an HRHC storage device class. The technology descriptor may also specify one or more nominal operating characteristics for the storage device. For example, the technology descriptor may specify a maximum I/O latency. The I/O latency is the time required for each I/O operation to complete. In a certain embodiment, the technology descriptor specifies a make and model of storage device 145.

The failure threshold module 210 sets a predictive failure threshold for the storage device 145 in response to the technology descriptor as will be described hereafter. In one embodiment, the predictive failure threshold is a specified number of errors that occur within a specified time interval. Each error may be a failure to complete a storage operation within a specified response time.

The performance detection module 215 detects a storage device error that exceeds the predictive failure threshold as a storage device predictive failure as will be described hereafter. For example, if the predictive failure threshold is specified as ten (10) errors within a one minute interval, where each error is a failure to complete a read within one hundred milliseconds (100 ms) and/or a failure to complete a write within five hundred milliseconds (500 ms), the performance detection module 215 may detect a storage device error that exceeds the predictive failure threshold if eleven (11) such errors occur within a one minute interval.

In one embodiment the workload management detection module 220 detects workload management of the storage device 145 as will be described hereafter. The workload management detection module 220 may detect workload management of the storage device 145 from a storage device activity characteristic and/or a storage device environmental characteristic that are indicative of workload management. For example, if the storage device 145 is configured to enter a workload-managed state at an ambient temperature of seventy degrees Celsius (70° C.), the workload management detection module 220 may detect workload management when the ambient temperature of the storage device exceeds seventy degrees Celsius (70° C.).

In one embodiment, the threshold modification module 225 modifies the predictive failure threshold in response to detecting the workload management of the storage device 145 as will be described hereafter. In one example, if the predictive failure threshold is ten (10) errors within a one minute interval, the threshold modification module 225 may modify the predictive failure threshold to twenty (20) errors within a one minute interval in response to the workload management detection module 220 detecting workload management of the storage device 145.

In one embodiment, the remediation module 230 remedies the storage device predictive failure in response to detecting the storage device predictive failure as will be described hereafter. For example, the remediation module 230 may migrate data from the storage device 145 to remedy the storage device predictive failure. In one embodiment, the notification module 235 communicates a notification of the storage device predictive failure as will be described hereafter. For example, the notification module 235 may communicate a notification of a predictive failure error to an administrator. The apparatus 200 reduces erroneous failure predictions by employing the predictive failure threshold based on the technology descriptor for the storage device 145.

Figure 3:
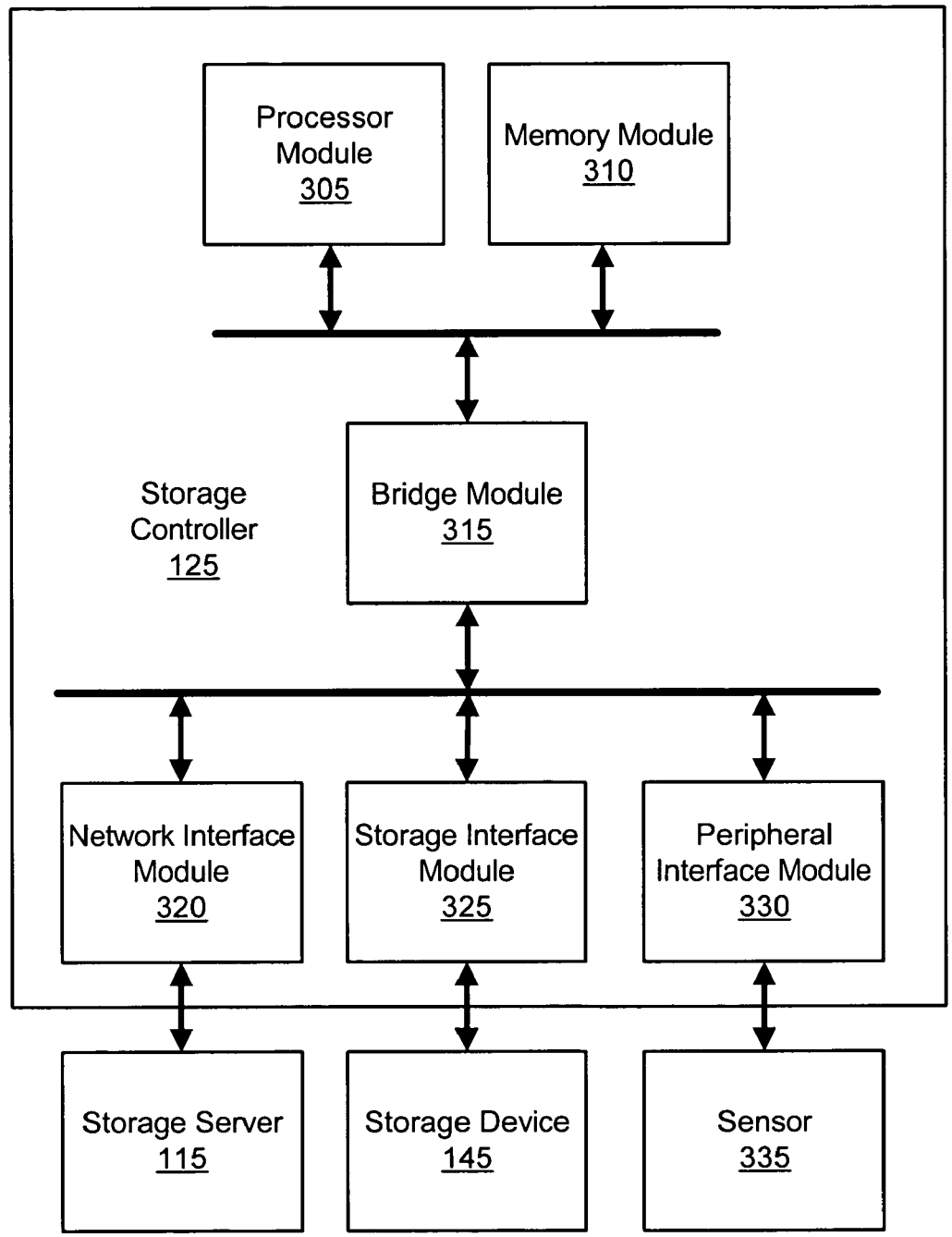
FIG. 3 is a schematic block diagram illustrating one embodiment of a storage controller of the present invention.

FIG. 3 is a schematic block diagram illustrating one embodiment of a storage controller 125 of the present invention. In one embodiment, the storage controller 125 is the storage controller 125 of FIG. 1 and embodies the apparatus 200 of FIG. 2. In addition, the description of the storage controller 125 refers to elements of FIGS. 1 and 2, like numbers referring to like elements. The storage controller 125 includes a processor module 305, a memory module 310, a bridge module 315, a network interface module 320, a storage interface module 325, and a peripheral interface module 330. In addition, the storage controller 125 is depicted in communication with a storage server 115, a storage device 145, and a sensor 335.

The processor module 305, memory module 310, bridge module 315, network interface module 320, storage interface module 325, and peripheral interface module 330 may be fabricated of semiconductor gates on one or more semiconductor substrates. Each semiconductor substrate may be packaged in one or more semiconductor devices mounted on circuit cards. Connections between the processor module 305, the memory module 310, the bridge module 315, the network interface module 320, the storage interface module 325, and the peripheral interface module 330 may be through semiconductor metal layers, substrate to substrate wiring, or circuit card traces or wires connecting the semiconductor devices.

The memory module 310 stores software instructions and data. The processor module 305 executes the software instructions and manipulates the data as is well know to those skilled in the art. In one embodiment, the memory module 310 stores and the processor module 305 executes one or more software processes comprising the technology descriptor module 205, failure threshold module 210, performance detection module 215, workload management detection module 220, threshold modification module 225, remediation module 230, and notification module 235 of FIG. 2.

The processor module 305 communicates with the network interface module 320, the storage interface module 325, and the peripheral interface module 330 through the bridge module 315. The storage interface module 325 may be a Fibre Channel interface, a SCSI interface, or the like. The network interface module 320 may be an Ethernet interface, a token ring interface, or the like. The peripheral interface module 330 may be a universal serial bus ("USB") interface, a serial port interface, or the like. The sensor 335 may be a temperature sensor.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
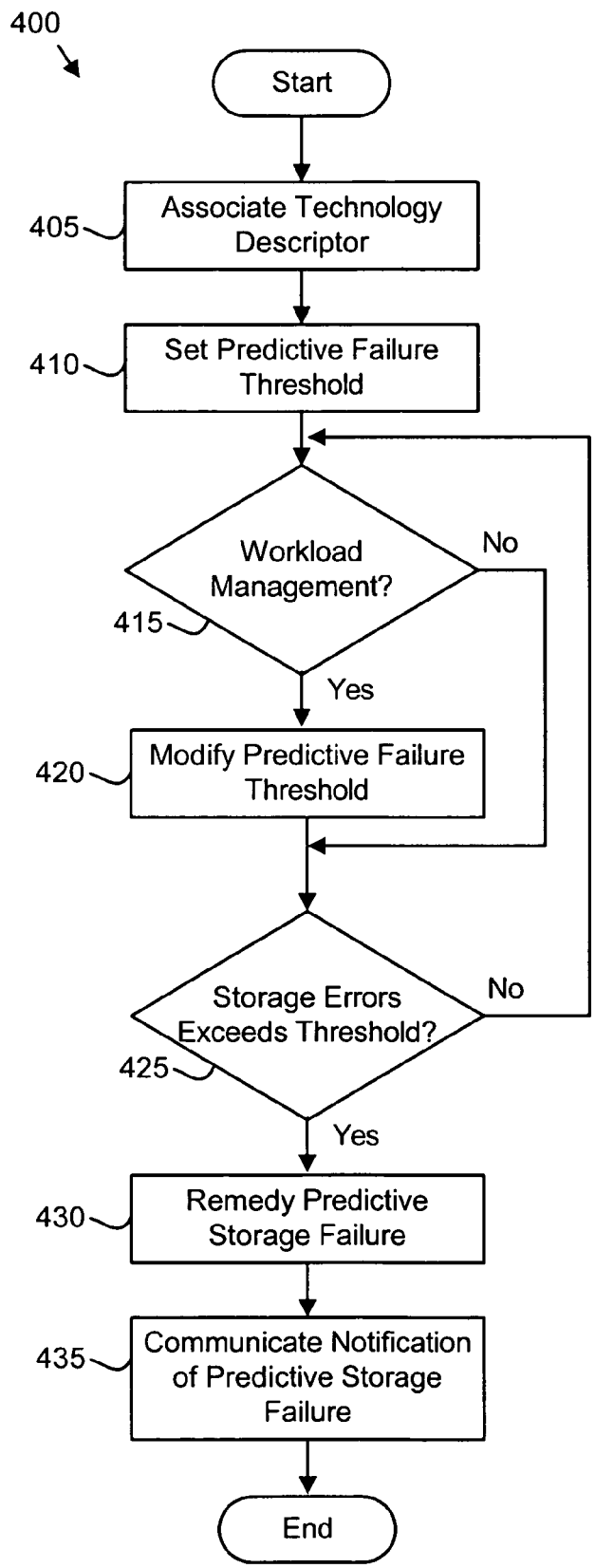
FIG. 4 is a schematic flow chart diagram illustrating one embodiment of a storage failure prediction method the present invention.

FIG. 4 is a schematic flow chart diagram illustrating one embodiment of a storage failure prediction method 400 the present invention. The method 400 substantially includes the steps to carry out the functions presented above with respect to the operation of the described apparatus 200, 300 and system 100 of FIGS. 1-3. In addition, the method 400 references elements of FIGS. 1-3, like numbers referring to like elements.

The method 400 begins and a technology descriptor module 205 associates 405 a technology descriptor with a storage device 145. An administrator may communicate an identification of a storage device 145, a storage device class, and/or a nominal operating characteristics of the storage device 145 to the technology descriptor module 205, such as through a maintenance interface graphical user interface ("GUI") executing on a host 105 that is in communication with a storage controller 125. Alternatively, the storage device 145 may communicate an identification of the storage device 145 to the technology descriptor module 205 when the storage device 145 is placed in communication with a data storage system 130 and/or a storage controller 125. In a certain embodiment, the technology descriptor module 205 queries the storage device 145 to identify the storage device 145.

In one embodiment, the technology descriptor module 205 receives the identification of the storage device 145, the storage device class, and/or the nominal operating characteristics of the storage device 145. The technology descriptor module 205 may associate 405 the technology descriptor with the storage device 145 in response to the identification.

In one embodiment, the technology descriptor identifies the storage device 145. For example, the technology descriptor may identify the make and model of the storage device 145. In an alternate embodiment, the technology descriptor describes a storage device class. For example, the technology descriptor may identify the storage device 145 as an HCLC storage device class.

In one embodiment, the technology descriptor identifies one or more nominal operating characteristics of the storage device 145. For example, the technology descriptor may identify a duty cycle supported by the storage device 145 such as a fifty percent (50%) duty cycle. In an alternate example, the technology descriptor may identify a minimum number of I/O operation executions supported by the storage device 145.

The technology descriptor module 205 may maintain a technology table that lists one or more make and model of storage device 145, one or more storage device class, and/or one or more nominal operating characteristic. Each technology table entry may have a corresponding technology descriptor. In one example, an HRHC storage device class may have a corresponding HRHC technology descriptor. The technology descriptor module 205 may locate a corresponding storage device identification in the technology table and associate the identification of the storage device 145 with a corresponding technology descriptor. For example, the technology descriptor module 205 may associate the HRHC storage device class with the HRHC technology descriptor.

A failure threshold module 210 sets 410 a predictive failure threshold for the storage device 145 in response to the technology descriptor. In one embodiment, the failure threshold module 210 maintains a threshold table comprising one or more technology descriptor values and one or more corresponding predictive failure thresholds for each technology descriptor value. For example, the threshold table may associate a first technology descriptor with a value of 'HCLC storage device' with a first predictive failure threshold of ten (10) errors within a one-minute interval and a second predictive failure threshold of a sixty percent (60%) duty cycle. The failure threshold module 210 may set the predictive failure threshold for the technology descriptor to the first predictive failure threshold of ten (10) errors and/or the second predictive failure threshold of a duty cycle of sixty percent (60%) according to a failure prediction methodology employed by the performance detection module 215. For example, if the performance detection module 215 detects a storage error as a duty cycle that is below a minimum duty cycle value, the failure threshold module 210 may set the predictive failure threshold to the second predictive failure threshold of the sixty percent (60%) duty cycle.

In one embodiment, the threshold table may include one or more corresponding predictive failure thresholds and one or more corresponding workload-managed predictive failure thresholds for each technology descriptor value. For example the first technology descriptor with a value of 'HCLC storage device' may have a corresponding predictive failure threshold of ten (10) errors per minute and a workload-managed predictive failure threshold of twenty (20) errors per minute.

In one embodiment, a workload management detection module 220 detects 415 workload management of the storage device 145. In one embodiment, the workload management detection module 220 queries the storage device 145 to detect the workload management. For example, the workload management detection module 220 executing on the storage controller 125 may query the storage device 145 concerning workload management. The storage device 145 may respond with the workload management status of the storage device 145.

In one embodiment, the workload management detection module 220 employs an activity characteristic of the storage device 145 to detect 415 workload management. For example, the workload management detection module 220 may determine the storage device 145 is in a workload managed state if the duty cycle of the storage device falls below twenty-five percent (25%). Alternatively, the workload management detection module 220 may employ an environmental characteristic to detect 415 workload management. For example, the workload management detection module 220 may determine the storage device 145 is in a workload managed state if the ambient temperature of the storage device 145 is above sixty degrees Celsius (60° C.).

If the workload management detection module 220 detects 415 workload management, a threshold modification module 225 may modify 420 the predictive failure threshold in response to detecting the workload management of the storage device 145. The threshold modification module 225 may modify 420 the predictive failure threshold by multiplying the predictive failure threshold by a constant. For example, if the predictive failure threshold is eight (8) errors per minute and the workload management detection module 220 detects 415 workload management of the storage device 145, the threshold modification module 225 may multiple the predictive failure threshold by the constant one point five (1.5) to yield the modified predictive failure threshold of twelve (12) errors per minute.

Alternatively, the threshold modification module 225 may modify 420 the predictive failure threshold by selecting a workload-managed predictive failure threshold corresponding to the technology descriptor from the threshold table. For example, if the predictive failure threshold is eight (8) errors per minute and the workload managed predictive failure threshold is thirteen (13) errors per minute for the technology descriptor, and the workload management detection module 220 detects 415 workload management of the storage device 145, the threshold modification module 225 may modify the predictive failure threshold to thirteen (13) errors per minute.

If the workload management detection module 220 does not detect 415 workload management, a performance detection module 215 detects 425 a storage device error that exceeds the predictive failure threshold as a storage device predictive failure. In one embodiment, the performance detection module 215 tracks storage device errors in an error log. The performance detection module 215 may periodically scan the error log for a number of errors that exceed the predictive failure threshold.

Alternatively, the performance detection module 215 may initialize a counter for a storage device 145, increment the counter for each storage device error, and decrement the counter by a specified number after each specified time interval. The performance detection module 215 may detect 415 the storage device error exceeding the predictive failure threshold if the counter exceeds the predictive failure threshold.

In one embodiment, the performance detection module 215 queries the storage device 145 to detect 425 the storage device error that exceeds the predictive failure threshold. For example, the performance detection module 215 may query the storage device 145 for the duty cycle of the storage device 145, and detect the storage device error that exceeds the predictive failure threshold if the duty cycle of the storage device 145 is less than the duty cycle specified by the predictive failure threshold.

If the performance detection module 215 does not detect 425 the storage device error exceeding the predictive failure threshold, the workload management detection module 220 detects 425 workload management of the storage device 145. If the performance detection module 215 detects 425 the storage device error exceeding the predictive failure threshold, a remediation module 230 may remedy 430 the storage device predictive failure in response to detecting the storage device predictive failure.

In one embodiment, the remediation module 230 migrates data from the storage device 145 to remedy 430 the storage device predictive failure. In addition, the remediation module 230 may take the storage device 145 offline to remedy 430 the storage device predictive failure. For example, if the performance detection module 215 detects a storage device predictive failure for a first storage device 145a, the remediation module 230 may copy data from the first storage device 145a with a to a second storage device 145b and take the first storage device 145a offline. In a certain embodiment, if the first storage device 145a is mirrored by the second storage device 145b and the performance detection module 215 detects 425 a storage device predictive failure for the first storage device 145a, the remediation module 230 may direct that data be accessed using the second storage device 145b.

In one embodiment, a notification module 235 communicates 435 a notification of the storage device predictive failure and the method 400 terminates. For example, the notification module 235 may communicate 435 an error message to a computer workstation such that the administrator may receive the notification. Alternatively, the notification module 235 may communicate 435 the notification to a log such as a system log. The method 400 sets 410 the predictive failure threshold in response to the technology descriptor for the storage device 145 and predicts a failure of the storage device 145 using the predictive failure threshold.

Figure 5:
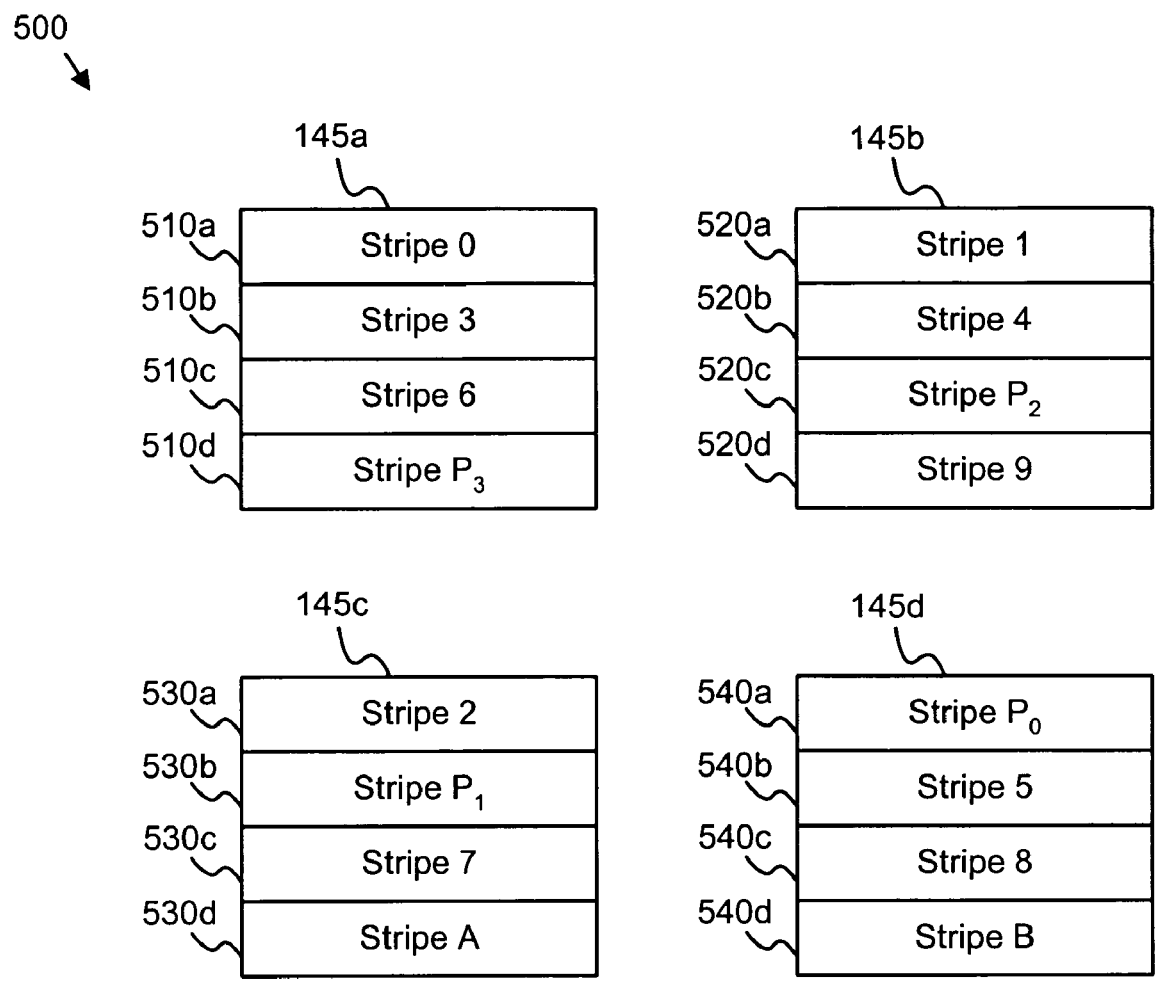
FIG. 5 is a schematic block diagram illustrating one embodiment of a RAID system of the present invention.

FIG. 5 is a schematic block diagram illustrating one embodiment of a RAID system 500 of the present invention. The system 500 may be embodied by on or more storage devices 145 of FIG. 1. In addition, the system 500 refers to elements of FIGS. 1-4, like numbers referring to like elements. Although for simplicity four storage devices 145 are depicted, any number of storage devices 145 may be employed.

In one embodiment, the storage devices 145 are hard disk drives. Each storage device 145 stores data as a plurality of stripes 510, 520, 530, 540. A stripe 510, 520, 530, 540 from each storage device 145 may form a stripe group. For example, the first stripes 510a, 520a, 530a, 540a of each storage device may form a first stripe group.

As depicted, the first stripes 510a, 520a, 530a for the first, second and third storage devices 145a, 145b, 145c store data while the first stripe 540a of the fourth storage device 145d stores redundant data. If one of the first, second and third storage devices 145a, 145b, 145c fail, the data of the failed storage device 145 may be recovered using the data of the remaining storage devices 145 and the redundant data of the fourth storage device 145d.

Figure 6:
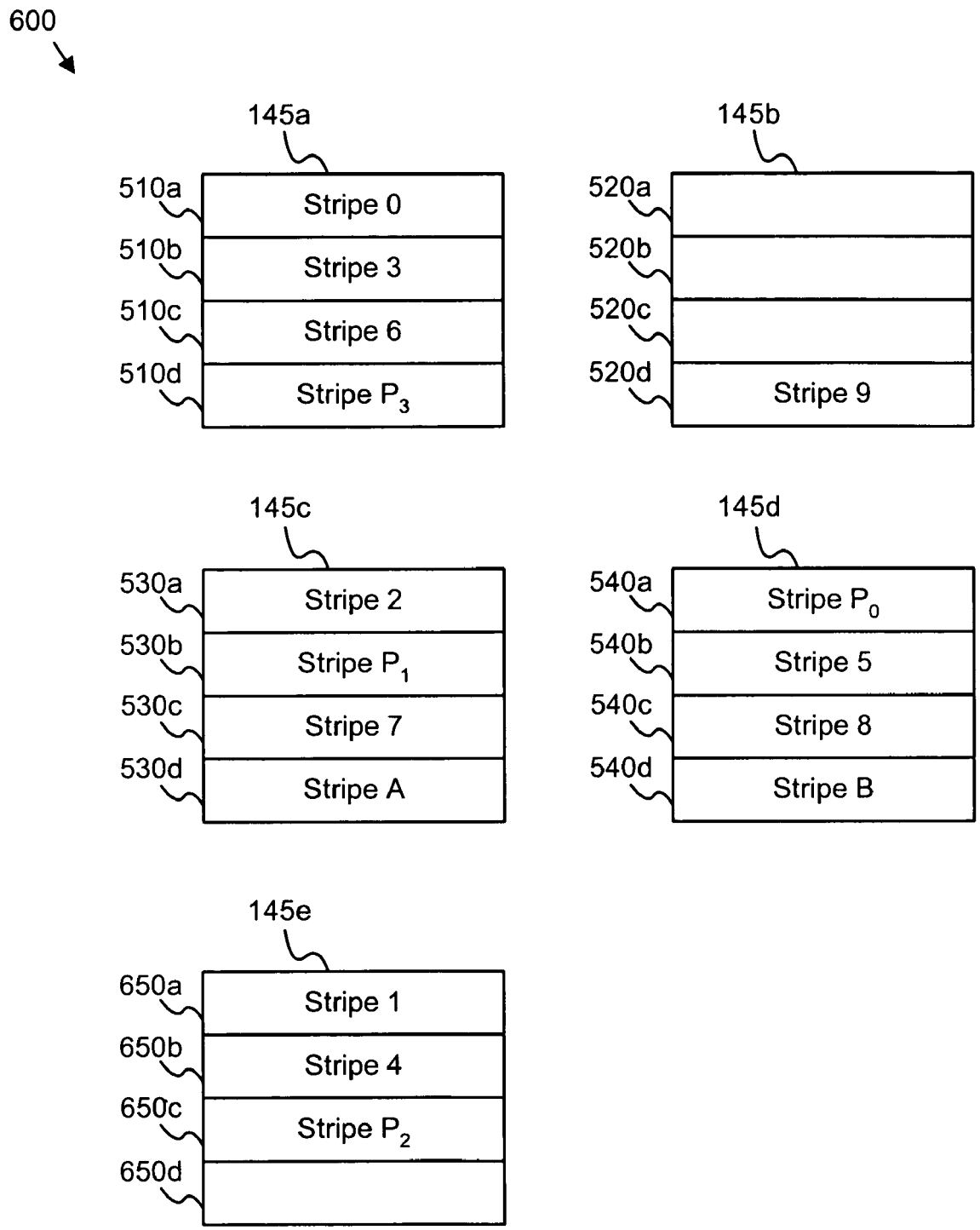
FIG. 6 is a schematic block diagram illustrating one embodiment of migrating data for a RAID system of the present invention.

FIG. 6 is a schematic block diagram illustrating one embodiment of migrating data for a RAID system 600 of the present invention. The system 600 includes the storages devices 145 of FIG. 5. In addition, the system 600 references elements of FIGS. 1-4, like numbers referring to like elements.

The performance detection module 215 detects 425 a storage device error for the second storage device 145b that exceeds the predictive failure threshold as a storage device predictive failure. The remediation module 230 may migrate data the stripes 520a-d of the second storage device 145b to a fifth storage device 145e. The first, second, and third stripes 520a-c of the second storage device 145b are depicted as migrated to the fifth storage device 145e.

The embodiment of the present invention sets 410 a predictive failure threshold in response to a technology descriptor associated with a storage device 145 and detects 425 potential storage device failures using the predictive failure threshold. In addition, the embodiment of the present invention may modify the predictive failure threshold in response to detecting workload management of the storage device 145.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to predict storage device failure, the apparatus comprising:
    a technology descriptor module comprising a semiconductor device storing executable code executed by a processor and configured to associate a technology descriptor with a storage device;
    a failure threshold module comprising the semiconductor device storing executable code executed by the processor and configured to set a predictive failure threshold for the storage device in response to the technology descriptor;
    a workload management detection module comprising the semiconductor device storing executable code executed by the processor and configured to detect workload management of the storage device in response to a storage device duty cycle decrease and a storage device environmental characteristic exceeding a threshold;

a threshold modification module comprising the semiconductor device storing executable code executed by the processor and configured to modify the predictive failure threshold in response to detecting the workload management of the storage device; and a performance detection module comprising the semiconductor device storing executable code executed by the processor and configured to detect a storage device error that exceeds the predictive failure threshold as a storage device predictive failure.

2. The apparatus of claim 1, further comprising a remediation module comprising the semiconductor device storing executable code executed by the processor and configured to remedy the storage device predictive failure in response to detecting the storage device predictive failure.

3. The apparatus of claim 2, wherein the remediation module is further configured to access data from a mirror storage device to remedy the storage device predictive failure.

4. The apparatus of claim 1, further comprising a notification module configured to communicate a notification of the storage device predictive failure.

5. The apparatus of claim 1, wherein the threshold modification module modifies the predictive failure threshold by multiplying the predictive failure threshold by a constant.

6. A computer readable storage medium storing computer executable code when executed by a processor to perform an operation to predict storage device failure, the operation comprising:

associating a technology descriptor with a storage device, wherein the technology descriptor specifies nominal operating characteristics for the storage device;

setting a predictive failure threshold for the storage device in response to the technology descriptor;

detecting workload management of the storage device in response to a storage device duty cycle decrease and a storage device environmental characteristic exceeding a threshold;

modifying the predictive failure threshold in response to detecting the workload management of the storage device; and detecting a storage device error that exceeds the predictive failure threshold as a storage device predictive failure.

7. The computer readable storage medium of claim 6, wherein the workload management of the storage device is detected by querying the storage device.

8. The computer readable storage medium of claim 6, wherein the predictive failure threshold is configured as a specified number of errors within a specified time interval, and wherein each error is a failure to complete a storage operation within a specified response time.

9. The computer readable storage medium of claim 6, further comprising an operation to remedy the storage device predictive failure in response to detecting the storage device predictive failure.

10. The program of claim 9, further comprising an operation to migrate data from the storage device to remedy the storage device predictive failure.

11. The computer readable storage medium of claim 9, further comprising an operation to access data from a mirror storage device to remedy the storage device predictive failure.

12. The computer readable storage medium of claim 6, further comprising an operation to communicate a notification of the storage device predictive failure.

13. The program of claim 6, wherein the predictive failure threshold is modified by multiplying the predictive failure threshold by a constant.

14. A system to predict storage device failure, the system comprising:

a storage device configured to store data;

a storage controller configured to manage the storage device and comprising a technology descriptor module configured to associate a technology descriptor with a storage device, wherein the technology descriptor specifies nominal operating characteristics for the storage device;

a failure threshold module configured to set a predictive failure threshold for the storage device in response to the technology descriptor;

a workload management detection module configured to detect workload management of the storage device in response to a storage device duty cycle decrease and a storage device environmental characteristic exceeding a threshold;

a threshold modification module configured to modify the predictive failure threshold in response to detecting the workload management of the storage device; and a performance detection module configured to detect a storage device error that exceeds the modified predictive failure threshold as a storage device predictive failure.

15. The system of claim 14, where the storage controller further comprises a remediation module configured to remedy the storage device predictive failure in response to detecting the storage device predictive failure.

16. The system of claim 14, wherein the predictive failure threshold is configured as a specified number of errors within a specified time interval, and wherein each error is a failure to complete a storage operation within a specified response time.

17. The system of claim 14, wherein the threshold modification module modifies the predictive failure threshold by multiplying the predictive failure threshold by a constant.

18. A method for deploying computer infrastructure, comprising integrating computer-readable code into a computing system, wherein the code in combination with the computing system is capable of performing the following:

associating a technology descriptor with a storage device, wherein the technology descriptor specifies nominal operating characteristics for the storage device;

setting a predictive failure threshold for the storage device in response to the technology descriptor, wherein the predictive failure threshold is configured as a specified number of failures within a specified time interval, and wherein each failure is a failure to complete a storage operation within a specified response time;

detecting workload management of the storage device in response to a storage device duty cycle decrease and a storage device environmental characteristic exceeding a threshold;

modifying the predictive failure threshold in response to detecting the workload management of the storage device; and detecting a storage device error that exceeds the modified predictive failure threshold as a storage device predictive failure.

* * * * *